Fig. 5

May 6, 1941.  M. MAUL  2,240,566

CARD PUNCHING MACHINE

Filed June 11, 1940  7 Sheets-Sheet 5

INVENTOR
Michael Maul
BY
W. M. Wilson
ATTORNEY

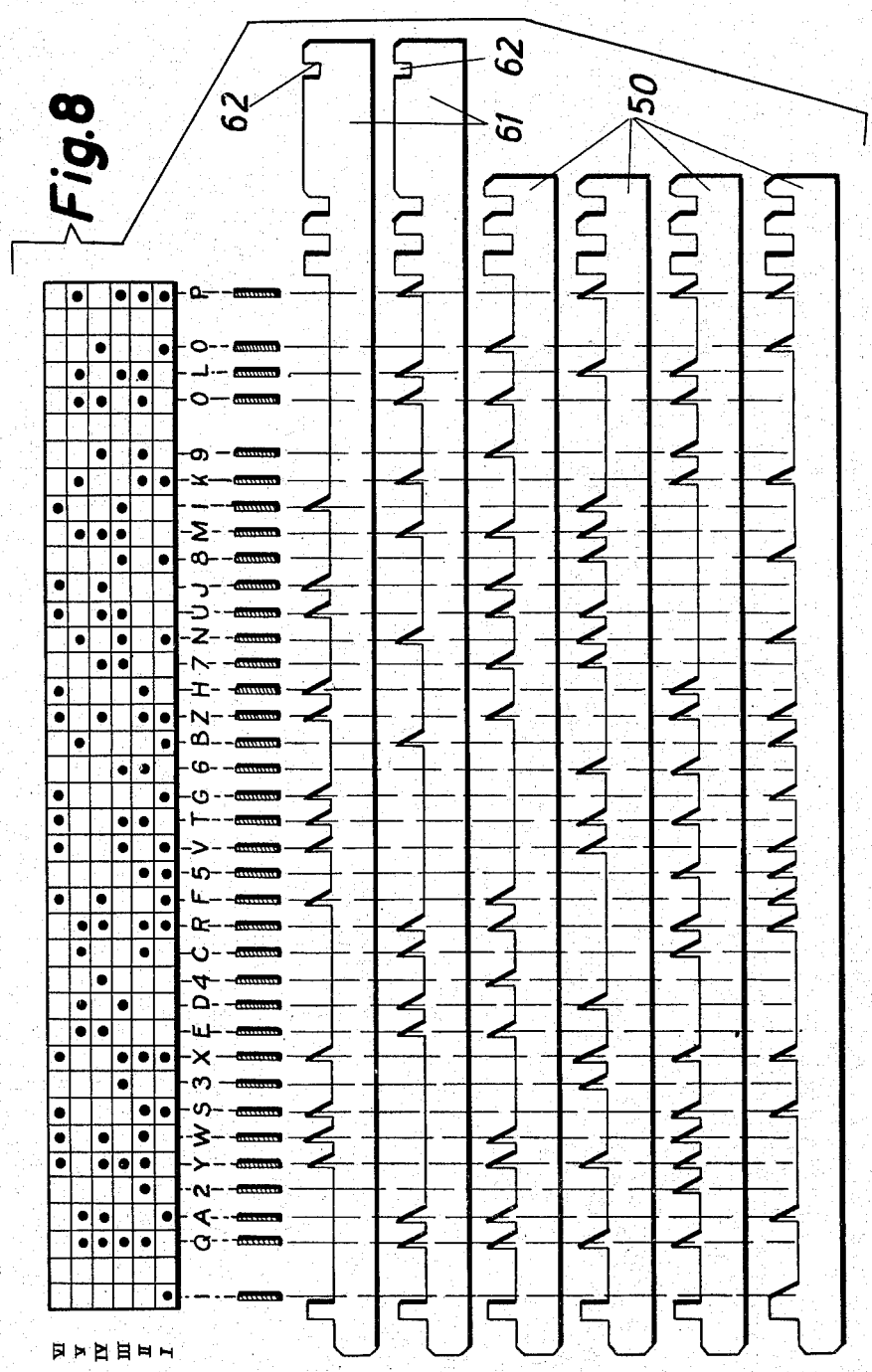

May 6, 1941.　　　　　M. MAUL　　　　　2,240,566
CARD PUNCHING MACHINE
Filed June 11, 1940　　　　　7 Sheets-Sheet 7
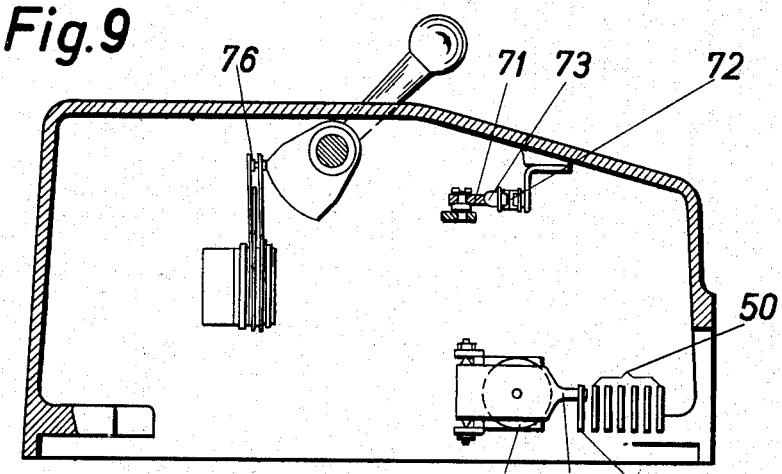
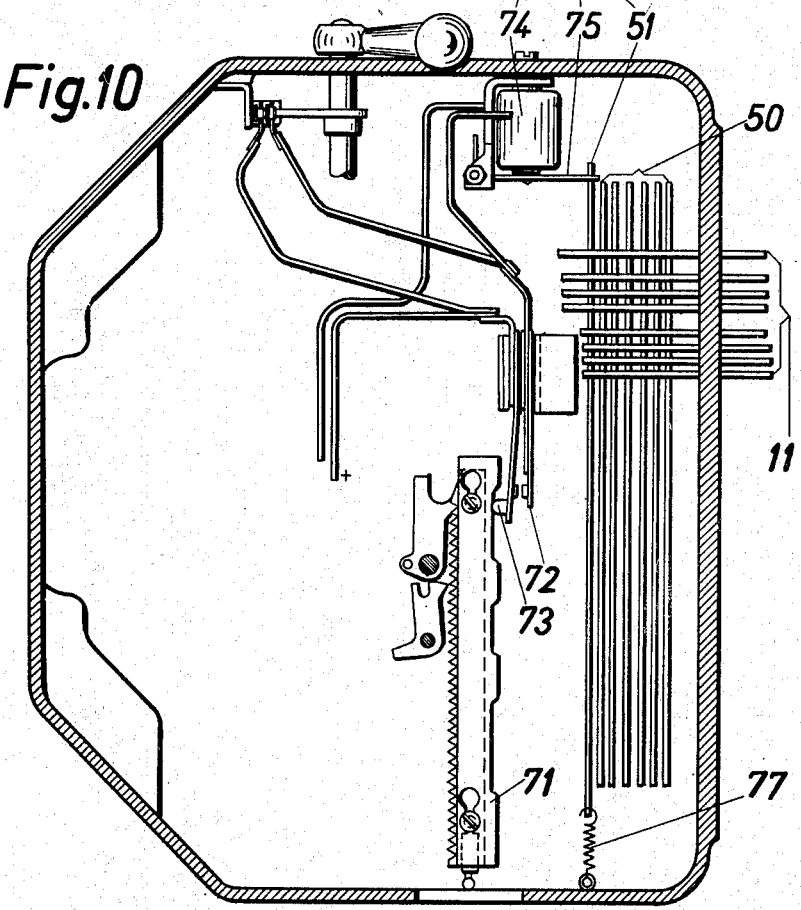
INVENTOR.
Michael Maul
BY
ATTORNEY Patented May 6, 1941

2,240,566

UNITED STATES PATENT OFFICE 2,240,566

CARD PUNCHING MACHINE

Michael Maul, Berlin-Johannisthal, Germany, assignor to the firm Deutsche Hollerith Maschinen Gesellschaft m. b. H., Berlin-Lichterfelde, Germany Application June 11, 1940, Serial No. 339,851
In Germany November 11, 1939

6 Claims. (Cl. 164—112)

The present invention relates to improvements in locking devices for punching machines, and is particularly useful in that type of punching machine which is provided with two sets of keys, of which one set is operated to perforate a record to represent letters, and the other is operated to perforate a record to represent numerals.

As is well known in this art, punching machines of the type which are adapted to perforate record cards utilize individual cards as the means for receiving the perforations to represent alphabetical and numeral characters. Such cards have common dimensions and are sub-divided into card columns so that each card column may receive one or more perforations to represent a character. A plurality of associated characters are represented in a plurality of card columns which comprise a card field.

According to the Hollerith system of character designation, usually a single hole represents a single character but in the combinational designation system, a plurality of holes are utilized and by the last mentioned system, the representations of the characters may use fewer index point positions than is possible in the Hollerith system of character designation.

The saving in card space resulting from the adoption of the combinational designation system has enabled the card to be further sub-divided into two card fields, which are distinct from the card fields containing associated characters, and in the terminology of this art are sometimes known as "perforation decks." In the usual form of record card, these "decks," as designated herein, are superposed, each consisting of a plurality of card columns. When perforations are made in these decks, one deck may be perforated to represent the alphabetical characters and the other to represent numerals and to prevent erroneous operations, it is desirable to lock out of operation the particular set of keys which is not in use.

It is, therefore, the main object of the present invention to provide a locking means which is effective for locking out one of the sets of keys when that particular set of keys is not to be used for punching operations.

A more specific object of the present invention is to provide a locking mechanism for one set of keys, and which is controlled by a perforation deck selecting means so that when punching operations are to be effected in a selected deck, one set of keys will be locked against operation.

Other objects of the invention will be pointed out in the following description and claims and illustrated in the accompanying drawings, which disclose, by way of example, the principle of the invention and the best mode, which has been contemplated, of applying that principle.

The present invention is particularly useful in that form of punching machine wherein the upper deck, for example, is provided to represent both alphabetical and numerical characters and the lower deck is selected to receive perforations representing only numeral characters. Where characters are designated in the combinational system, in one system of character designation, numerals may be represented by holes at four index point positions and alphabetical characters may be represented by holes at six index point positions. As intimated, the lower deck is utilized to receive holes representing only numerals which may be made in any of the four index point positions in the lower deck. It is obvious that an accidental operation of one of the alphabet keys would perforate one of the columns of the lower deck and such perforations would be made in one or two index point positions above those used for numerals, thereby overpunching the lower deck. To prevent such misoperations, a locking mechanism is rendered effective upon selection of the lower deck to effectively lock out the alphabet keys against operation.

The present invention may be constructed according to one or more embodiments or modifications and in the present disclosure, three different locking arrangements are illustrated so as to disclose the wide variety of constructions which may be adopted, and which would be within the spirit of the invention.

In one of the embodiments, a locking bar of a simple type is located beneath the key levers and upon its movement to an effective locking position, the alphabet keys are locked. This locking action is controlled by the lever which selects the lower deck for punching operations. In the second embodiment, the locking bar just referred to is eliminated and one or more of the punch selecting bars which are shifted only by the depression of the alphabet keys are utilized to perform the locking function. These bars are operated only by the alphabet keys and, obviously, by locking them against operation upon the selection of one deck, such keys may not be depressed. While this arrangement is somewhat simpler than the first described embodiment, it may be applied only when certain designation codes are selected for representing alphabet and numerals, as will be more apparent as the specification is understood.

Each of the two embodiments just referred to is of the mechanical type, and in the present disclosure the third embodiment is electrical in nature and construction. An additional feature of the last named embodiment includes an arrangement whereby the locking action may be utilized in connection with the punching operations for the upper deck. This arrangement includes a control by the card carriage whereby the alphabet keys are locked against operation when such designations are not to occur in certain card columns of the upper deck.

As has just been described, the invention is disclosed in several modifications which are to be considered as the preferred embodiments of the modifications and which are shown in the accompanied drawings in which:

Fig. 5 is a combined diagrammatic view showing at the top of the figure a code for representation of numeral and alphabet characters. This view also shows the association of the key levers of the alphabet and numeral keys, the punch selector bars, and the locking bar which is constructed according to the first embodiment of the invention.

Fig. 8 is a combined diagrammatic view relating to the second embodiment of the invention and shows the preferred form of code for representing numerals and alphabetical characters. This view also shows the association of the key levers of the alphabet and numeral keys with the punch selecting bars and makes it more clear by such illustration, the reason why it is possible in some arrangements to employ two of the punch selector bars operated by the alphabet keys for locking the alphabet keys against operation.

Figs. 9 and 10 are sectional and plan views, respectively, of the arrangement forming the third embodiment of the invention. As previously described, this embodiment is electrical in construction and further includes the feature of locking out one set of keys under control of the punching carriage of the machine.

Figure 1:
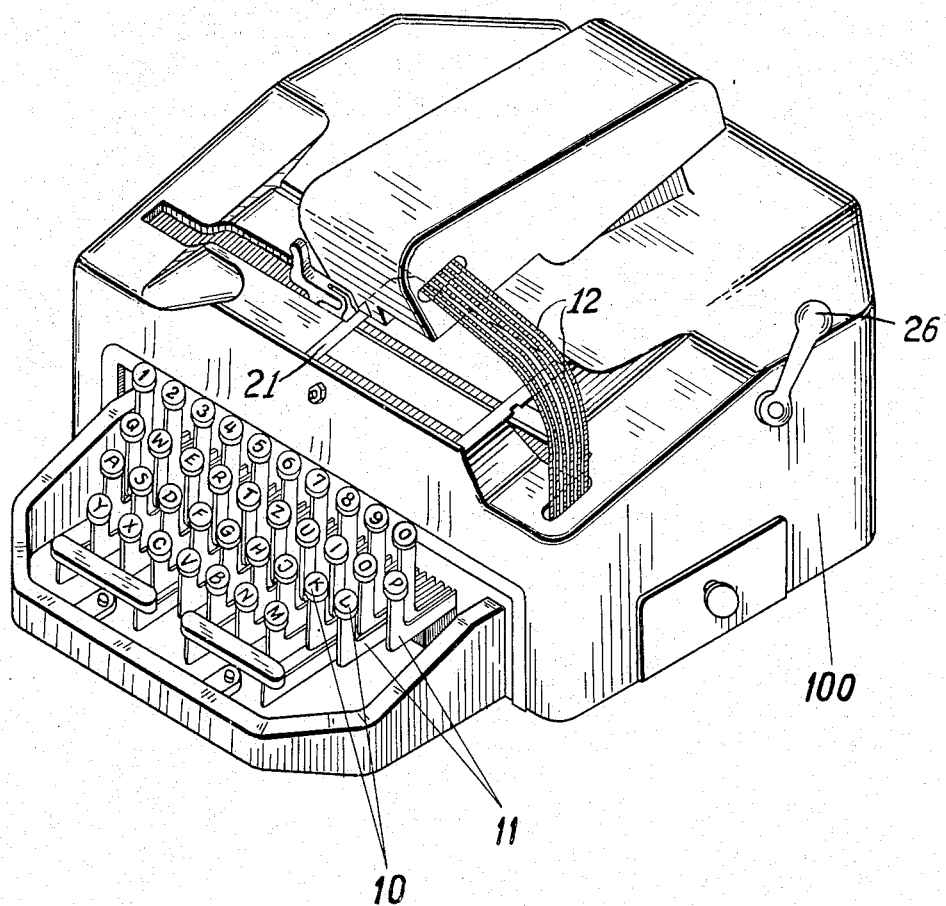
Fig. 1 is a perspective view of the assembled punching machine which is adapted under control of numeral and alphabet keys to perforate a record card in two separate decks.
Figure 2:
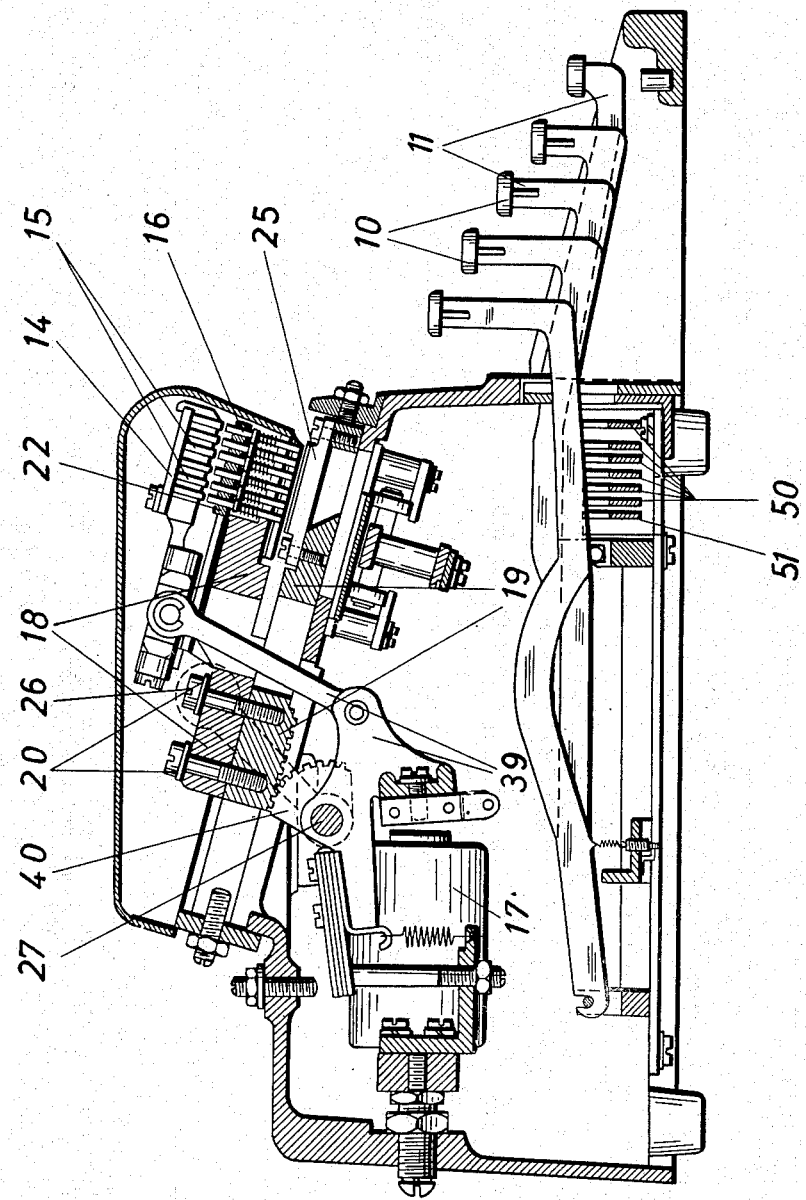
Fig. 2 is a central transverse sectional view of the punching machine shown in Fig. 1.

The present invention is preferably incorporated in the form of punching machine shown in Figs. 1 and 2, but it is to be understood that the showing of this machine is merely illustrative and not restrictive. It should be further understood that the invention may be applied to other forms of punching machines which are adapted to punch in two different decks, and in which the operation of certain of the keys are to be prevented when punching operations in one deck are being performed.

The punching machine shown in Figs. 1 and 2 is fully shown and described in the U. S. Patent application to M. Maul, Serial No. 270,324, filed April 27, 1939, now Patent No. 2,210,552, dated August 6, 1940. For this reason only a general description of the construction and operation of the punching machine will be given, and only in sufficient detail to understand the coordination of the present improvements. For further details of operation and construction of the punching machine, reference may be had to the aforementioned patent.

As more fully explained in the patent, the punching machine is designed and arranged for the perforation of two decks of a record card 21 (Fig. 1) and in the upper deck perforations may be disposed so as to designate alphabetical characters and numerals, but when the machine is conditioned for perforating the lower deck the latter is to be perforated to represent only numerals.

The punching machine is provided with a single set of punches 16 (Fig. 2) which are commonly utilized for perforating both decks. These punches may be selectively coordinated with the decks by displacing the punches so that they will be operatively correlated with the desired deck and this selective coordination is controlled by a deck selecting lever 26 which, as shown in Fig. 1, is operable exterior of the machine, and may be preliminarily adjusted to predetermine the deck which is to be perforated. The aforementioned punches 16 comprise a single set of six punches and they are carried by a carriage which consists, primarily, of two members designated 18 and 19 in Fig. 2 and which are interconnected by means of screws 20. The member 19 is slidably mounted in grooves of dovetail formation formed in the machine housing so that the carriage may be slidably mounted and moved forwardly or rearwardly by the manipulation of the lever 26. The member 19 also carries a die plate 25 (Fig. 2).

The dividual selection of the punches 16 is effected by the operative displacement of punch selector slides 15 which are slidably adjusted in a punch operating plate 14, and the displacement of the slides 15 is effected by means of Bowden wires which are attached to the selector slides 15 and slide in guide tubes 12, best shown in Fig. 1. The ends of the Bowden wires are connected to the extremities of selector bars 50. By the lateral displacement of the selector bar 50, the related slide 15 will be operatively displaced through the interconnecting Bowden wire, all of which is more fully shown and described in the aforementioned patent.

Figure 5:
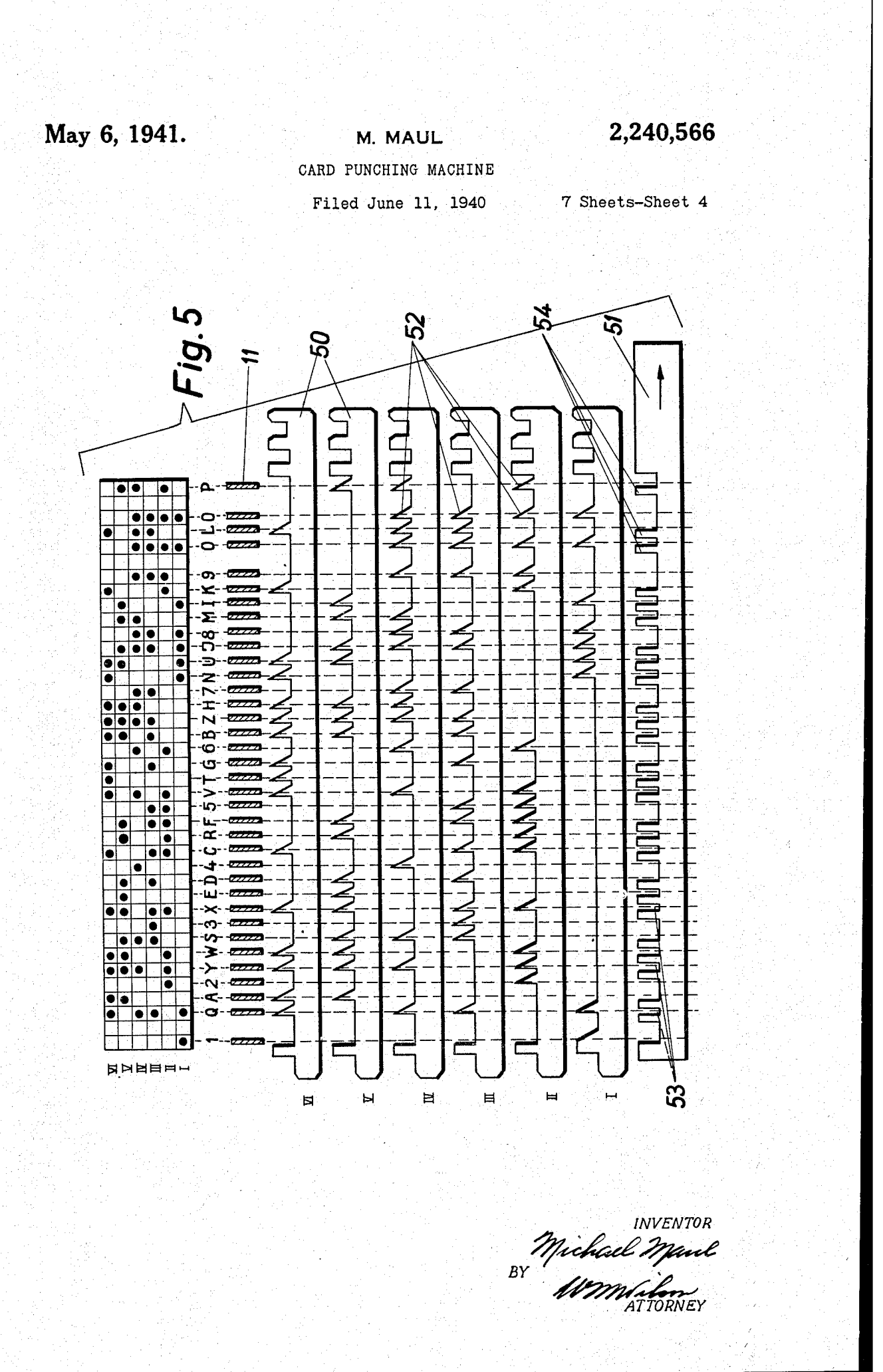

As best shown in Fig. 5, the representations of the alphabetical characters and the numerals are effected by perforations in different hole combinations, the numerals being designated by four hole combinations and the alphabetical characters by six hole combinations. The perforating of the columns of the card in combinationally arranged holes is determined by the displacement of selector bars 50 in different combinations, so that when a key is depressed certain bars 50 will be displaced to effect the displacement of the corresponding punch selector slides 15. This selective displacement of bars 50 is caused by the depression of the key levers 11 of the operating keys 10 (Fig. 1) and, as diagrammatically shown in Fig. 5, the depression of a key lever 11 will cause it to coact with inclined cam portions 52 provided on the selector bars 50. For example, when the "1" numeral key 10 is depressed, its lever 11 will coact with the inclined cam portion 52 of the selector bar 50—I, thereby causing the displacement of this bar to effect the selection of the punch which will perforate at the I index point position, thus designating the numeral "1" in a card column. When the alphabetical key Q is depressed, its lever 11 will coact with the inclined cam portions 52 of the selector bars 50—VI, IV, III, I, causing holes to be made at corresponding index point positions, as is diagrammatically shown in the top of Fig. 5, so as to designate the letter "Q."

After the preliminary displacement of the selector slides 15 for causing the selection of certain punches 16 (Fig. 2), as more fully explained in the aforementioned patent, a magnet 17 is energized and this will cause the attraction of its armature, thereby rocking a plate connected to the armature and which is loosely mounted upon a shaft 27. As more fully shown and described in the patent, this will cause the depression of the punch operating plate 16 and through the displaced selector slides 15, certain of the punches 16 will be depressed forcing them through the card to make the desired perforations. As is well known, after a column has been perforated, the card will be given a step of movement to correlate a successive card column with the set of punches 16. This also is fully shown and described in the patent.

In Fig. 2 the punching carriage is shown in its position of adjustment for causing the perforations to be disposed in the lower deck and when the machine is to be conditioned for effecting punching in the upper deck, the operating lever 26 (Fig. 1) is moved rearwardly to the position shown in Fig. 1. The operating lever 26 is secured to a shaft 27 and as shown in Fig. 2, a segment 40 is secured to the shaft 27 and this segment meshes with teeth formed at the underside of the member 19. Obviously, as shaft 27 is rocked counterclockwise by moving lever 26 rearwardly, the punching carriage will be moved rearwardly, thus coordinating the punches 16 with the columns of the upper deck.

As has just been described, the depression of the keys 10 will result in the adjustment of certain of the selector bars 50 and, as is best shown in Fig. 2, these bars are positioned just below the operating levers 11 of the keys 10. As also shown in Fig. 2 a locking bar 51 is arranged beneath the levers 11 in a similar manner. The formation of the locking bar 51 is shown at the bottom of Fig. 5 wherein it will be seen that it is provided with a series of notches 53 and locking fingers 54 and whether or not a key lever 11 may be depressed to move a selector bar 50 will be dependent upon whether the key lever may be received by a correlated notch 53. In the position of the locking bar 51 shown in Fig. 5, it will be seen that from the paths of movement of the key levers 11 which are shown in Fig. 5 by dotted lines, the key levers 11, whether they comprise the key levers of either the numeral or alphabetical keys, will enter the notches 53. This position of the locking bar 51 is the position in which it assumes when the card punching mechanism will cause punching in the upper deck, it being obvious that at this time, either the numeral keys or the alphabetical keys may be freely depressed.

To effect the desired locking of certain of the keys, the locking bar 51 is moved one step in the direction of the arrow shown in Fig. 5, thereby bringing locking fingers 54 in the paths of the movement of the operating levers 11 of the alphabetical keys. These locking fingers will be disposed directly beneath the operating levers 11 of the alphabetical keys so as to effectively prevent their depression, permitting, however, the free depression of the numeral keys. This is the locking action that takes place when the machine is conditioned for perforating in the lower deck and the means to cause the desired adjustment of the locking bar 51 will now be explained with particular reference to the preferred form of arrangement shown in Figs. 3 and 4. The arrangement is such that in accordance with the position of the lever 26, certain of the operating keys will be locked and in the preferred form of arrangement upon the adjustment of the punching mechanism to cause punching in the lower deck, the alphabetical keys are locked.

Figure 3:
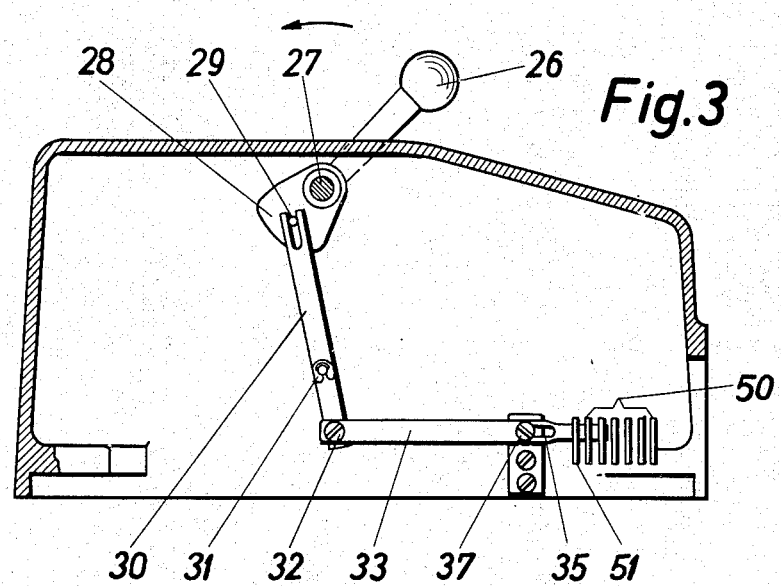
Fig. 3 is a detail view showing the operating connections between the perforation deck selecting lever and a locking bar comprising the first embodiment.
Figure 4:
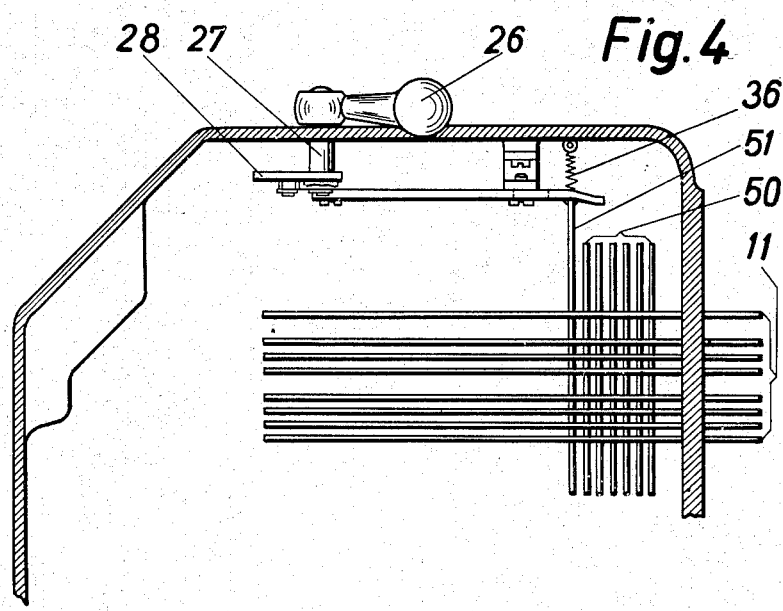
Fig. 4 is a plan view of the mechanism shown in Fig. 3.

The position of the locking bar 51 to lock the alphabet keys is shown in Fig. 4 and in such position the locking fingers 54 are beneath the key levers 11 of the alphabet keys. A spring 36 connected to the bar 51 urges the bar 51 so that it will coact with a plate 33, thus maintaining the bar 51 in such a position that the alphabet keys are locked. As best shown in Fig. 3, to the shaft 27 there is connected a plate 28 and which plate has a pin and a slot connection 29 with a double arm 30, the latter being loosely pivoted upon a stud 31. The lower arm of the double arm 30 is connected by a screw 32 to the aforementioned plate 33 and the latter is slidably mounted by means of a screw 37 which is carried by a bracket plate and which cooperates with a slot 35 in the plate 33. As shown in Fig. 4, the right end of the plate 33 is provided with a bent cam portion coacting with the extremity of the locking bar 51. By moving the lever 26 in the direction of the arrow shown in Fig. 3 so as to cause the punching to be made in the upper deck, shaft 27 will be rocked in the same direction, thereby rocking the plate 28 counterclockwise, rocking lever 30 clockwise to move plate 33 to the left as shown in Fig. 3. The cam portion of the extremity at the plate 33 will now cause the locking bar 50 to be moved one step to the left as shown in Fig. 5, bringing the locking bar 51 in the position shown in this figure. In this position of the locking bar 51, the key levers 11 of both the alphabet and numeral keys will be in the path of the notches 53 of the locking bar 51, enabling the unrestrained depression of all of these keys. Therefore, when punching is to be effected in the upper deck, all of the numeral and alphabet keys will be unlocked.

Figure 6:
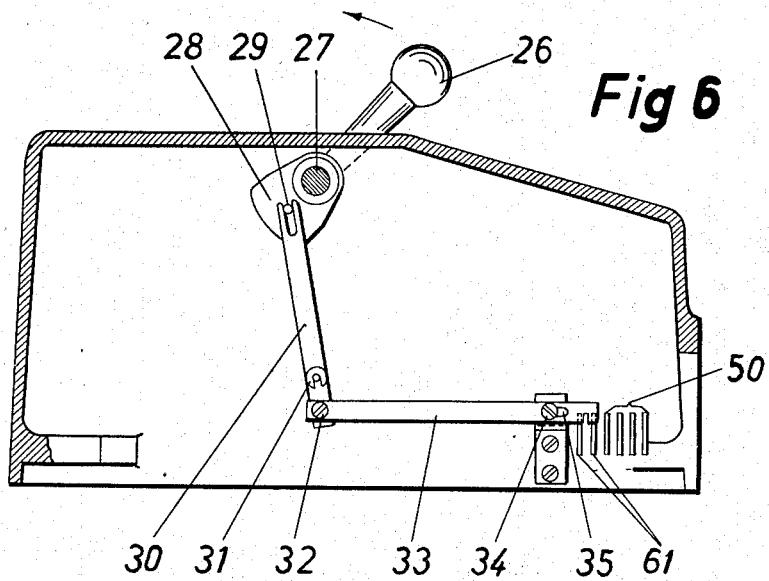
Figs. 6 and 7 are, respectively, sectional and plan views of the locking mechanism constructed according to the second embodiment of the invention.
Figure 7:
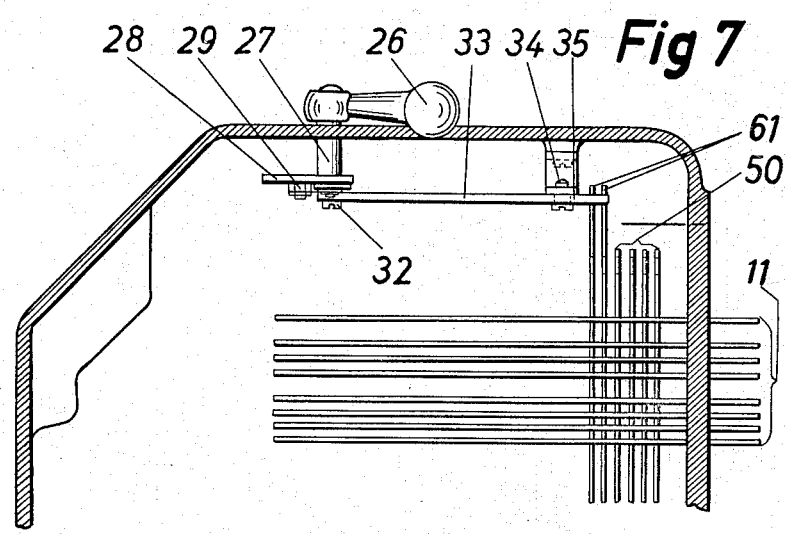

Another embodiment of the present invention is disclosed in Figs. 6, 7 and 8 and the adaptability of this embodiment for certain punching systems is based upon the recognition that for certain codes of punching some holes are not utilized for designations of certain characters, such as letters in the present case. This will be made more clear by an examination of the codes shown in both Figs. 5 and 8. It will be seen that for combinational designations representing numerals, the V and VI index point positions are not utilized. However, for representing alphabetical characters, holes occupying the upper two of the six different index point positions are utilized. It is obvious, therefore, that for representing alphabetical characters, the two upper punch selector bars designated 61 in Fig. 8 are only utilized for designation of alphabetical characters and it is further understood that such bars will not come into operation upon the actuation of the numeral keys. Obviously, if the designation of alphabetical characters should be prevented, it will only be necessary to lock the bars 61 to prevent the depression of the alphabet keys. The locking of the bars 61 to prevent the depression of the alphabet keys when the lower deck is selected for punching operations is effected by the mechanism shown in Figs. 6 and 7. It will be noted that the locking plate 33 in this arrangement has a connection with the lever 26 somewhat similar to that previously explained. When the lever 26 is in the position shown in Figs. 6 and 7, which will effect the selection of the lower deck for numeral punching, the plate 33 will be so positioned that it will be received by the notches 62 (see Fig. 8) of the bars 61. This will lock the alphabet keys against operation since the key levers thereof may be only depressed a slight amount and insufficient to cause a punching operation.

When the lever 26 is adjusted to effect the selection of the upper deck for both numeral and alphabetical punching, the slide 33 will be shifted to the left from the position shown in Fig. 6 and to such a position that the bars 61 are now unlocked. When the plate 33 is in this unlocking position, the rearmost bar 61 (Fig. 6) may freely move through a slot formed in the plate 33, and when the latter is in its unlocking position the right end of the plate 33 will be so positioned that it will be free of the other bar 61 (the second from the left in Fig. 6). Therefore, in this position of the bar 33, the alphabet keys may be freely actuated.

A third embodiment of the present invention is illustrated in Figs. 9 and 10 and exemplifies an electrical solution of the problem of locking the alphabet keys against operation for certain operations of the machine. Aside from the fact that Figs. 9 and 10 disclose an electrical embodiment, the locking bar 51, which is the same element employed in the embodiment shown in Figs. 3 and 4, is placed under joint control, as far as its locking action is concerned, of both the lever 26 and also the carriage of the punching machine. The control by the carriage is provided for the purpose of locking the alphabet keys against operation when certain card columns of the upper deck are to be punched and for other card columns of the upper deck, both the numeral and alphabet keys may be operated. The control of the locking of the alphabet keys for predetermined card columns is effected by means of a controlling bar or cam plate 71 (Fig. 10) which is provided with low and high cam portions co-extensive with one or more of the card columns. By means of a high cam portion of the cam plate 71 coacting with an insulating tip 73 of contacts 72, the latter will be closed when the carriage is in position for punching certain card columns. The closure of contacts 72 will, from the simple electrical circuit shown in Fig. 10, cause the energization of a magnet 74 and the latter, upon its energization, will attract its armature 75 and since the latter has an operating connection with the locking bar 51, the latter will be moved against the tension of a spring 77. This will, as is evident from Fig. 5, move the bar 51 to such a position that the locking fingers 54 thereof will now be in locking engagement with the key levers 11 of the alphabet keys to prevent their depression when punching operations are to be effected for certain card columns. This will enable the unrestrained operation of the numeral keys and the carriage will move step by step until the punches are correlated with a certain card column and at this time the insulating tip 73 will now move to a lower portion of the cam plate 71, thereby permitting contacts 72 to open. When contacts 72 open, magnet 74 will be deenergized, enabling spring 77 to move the locking bar 51 to its normal position which is shown in Fig. 5. In this position either the alphabet or numeral keys may be freely depressed.

The high and low cam portions of the cam plate 71 may be varied in accordance with the requirements so as to lock out the alphabet keys when certain card columns are to be punched. This preformed plate 71 is adapted by any suitable means to be carried by the card carriage of the punching machine.

As previously intimated, the lever 26 is also adapted to control the displacement of the bar 51 to effect a locking or nonlocking action as is required. As best shown in Fig. 9, when the lever 26 is in the position shown, and in which position the punching operations may be effected for the lower deck, contacts 76 will be closed, thereby, resulting in the energization of the magnet 74 and the displacement of the locking bar 51 so as to lock the alphabet keys against operation. When the lever 26 is moved to a rearmost position, the card punching operations will be effected for the upper deck and contacts 76 will open resulting in the deenergization of the magnet 74, and spring 77 will move the locking bar 51 to an unlocking position to enable the unrestrained depression of either the alphabet or numeral keys.

While there has been shown and described and pointed out the fundamental novel features of the invention as applied to the several modifications, it will be understood that various omissions, substitutions and changes in the form and details of the devices illustrated and in their operation may be made by those skilled in the art without departing from the spirit of the invention. It is the intention, therefore, to be limited only as indicated by the scope of the following claims.

What is claimed is:

1. In a record punching machine adapted to selectively punch in a plurality of decks thereof, the combination with a keyboard comprising two sets of punch controlling keys, one set for effecting numeral punching and the other set for effecting alphabet punching in said decks, of locking devices for one set of keys to prevent operation thereof, a deck selecting device for determining which deck is to be punched upon the operation of said keys, and means actuated by said selecting device and rendered effective upon selection of a certain deck for punching operations to cause said locking devices to be effective to lock one set of keys.

2. In a record punching machine adapted to selectively punch in a plurality of decks thereof, the combination with a keyboard comprising two sets of punch controlling keys, one set for effecting numeral punching in both decks, and the other set for effecting alphabet punching in one of said decks, of locking devices for said alphabet keys to prevent operation thereof, a deck selecting device for determining which deck is to be punched upon the operation of said keys, and means actuated by said selecting device and rendered effective upon selection of a certain deck for punching operations to cause said locking devices to be effective to lock the alphabet keys only when a certain deck is selected for punching operation.

3. A punching machine according to claim 2 which further includes a member movable step by step as successive punching operations are effected in the deck in which both numeral and alphabet punchings normally occur, and means controlled by said member and effective for certain card columns in said deck for causing said locking devices to be effective to lock said alphabet keys, whereby only said numeral keys may be operated to punch said certain card columns.

4. A punching machine constructed according to claim 1 in which said locking device consists of a notched bar having locking fingers and intermediate notches, and wherein said deck selecting device effects the locking of one of said sets of keys by interposing said fingers in the paths of the movement of said keys to prevent their operation.

5. In a record punching machine adapted to selectively punch in a plurality of decks thereof, the combination with a keyboard comprising two sets of keys, of a punching mechanism controlled by one set of keys to punch both alphabet and numeral data in one deck and controlled by the other set of keys to punch only numeral data in the other decks, selecting means for effecting a relative movement between said punching mechanism and the decks of said record to select a deck for punching operations, and means rendered effective by said selecting means to lock one of said sets of keys against operation upon the selection of a certain deck for punching operations.

6. A punching machine comprising two sets of keys, punches, a plurality of punch selector bars, means controlled by one set of keys for actuating all of said punch selector bars and controlled by the other set of keys for actuating only certain of said punch selector bars, locking means for the punch selector bars operated by the first named set of keys but which are unoperated by the second named set of keys, and selecting means for rendering said locking means effective at will.

MICHAEL MAUL.